(12) United States Patent
Rozmus

(10) Patent No.: US 7,126,244 B2
(45) Date of Patent: Oct. 24, 2006

(54) MAGNETIC BEARING ASSEMBLY USING REPULSIVE MAGNETIC FORCES

(75) Inventor: John J. Rozmus, Brewyn, PA (US)

(73) Assignee: Rozlev Corp., LLC, Media, PA (US)

( * ) Notice: Subject to any disclaimer, the term of this patent is extended or adjusted under 35 U.S.C. 154(b) by 0 days.

(21) Appl. No.: 11/027,541

(22) Filed: Dec. 30, 2004

(65) Prior Publication Data
US 2006/0145552 A1 Jul. 6, 2006

(51) Int. Cl.
*H02K 7/09* (2006.01)
(52) U.S. Cl. .................................................. 310/90.5
(58) Field of Classification Search ............... 310/90.5; 335/306; 446/133, 261, 256
See application file for complete search history.

(56) References Cited

U.S. PATENT DOCUMENTS

| 3,493,274 | A |   | 2/1970 | Emslie et al. | |
|---|---|---|---|---|---|
| 3,614,181 | A | * | 10/1971 | Meeks | 310/90.5 |
| 3,664,268 | A |   | 5/1972 | Lucas et al. | |
| 3,734,565 | A |   | 5/1973 | Mulasmjic | |
| 3,780,668 | A |   | 12/1973 | Schwärzler | |
| 3,809,433 | A |   | 5/1974 | Mulasmajic | |
| 4,320,927 | A |   | 3/1982 | Sertich | |
| 4,379,598 | A | * | 4/1983 | Goldowsky | 310/90.5 |
| 4,473,259 | A | * | 9/1984 | Goldowsky | 310/90.5 |
| 4,956,571 | A | * | 9/1990 | Gordon et al. | 310/90.5 |
| 5,010,563 | A |   | 4/1991 | Laurent et al. | |
| 5,177,387 | A | * | 1/1993 | McMichael et al. | 310/90.5 |
| 5,321,329 | A | * | 6/1994 | Hovorka | 310/90.5 |
| 5,506,459 | A | * | 4/1996 | Ritts | 310/90.5 |
| 5,720,010 | A | * | 2/1998 | Watanabe et al. | 700/258 |
| 5,783,886 | A | * | 7/1998 | Hong | 310/90.5 |
| 6,720,695 | B1 |   | 4/2004 | Coenen | |
| 2004/0107863 | A1 |   | 6/2004 | Falter et al. | |

FOREIGN PATENT DOCUMENTS

| AT | 383 874 B | 9/1987 |
|---|---|---|
| DE | 21 36 371 B | 2/1973 |
| GB | 539 409 A | 9/1941 |
| JP | 61-008245 A | 1/1986 |
| JP | 63-225721 A | 9/1988 |

* cited by examiner

*Primary Examiner*—Tran Nguyen
(74) *Attorney, Agent, or Firm*—RatnerPrestia

(57) ABSTRACT

A magnetic bearing assembly utilizes repulsive magnetic forces between components, having magnetic sources, of the bearing at two or more gaps which are angled with respect to an axis of the inner component. Each gap provides force vectors in two directions, while allowing for relative movement of the components in a third direction. The gaps collectively provide a stable equilibrium in the first two directions, meaning that, in response to relative movement of the components in the first or second direction causing a decreased gap width, magnetic repulsive forces at the decreased gap width urge the components away from each other to return to equilibrium. The components of a radial magnetic bearing according to the invention move relative to one another rotationally, and the components of a linear magnetic bearing according to the invention move relative to one another longitudinally.

14 Claims, 3 Drawing Sheets

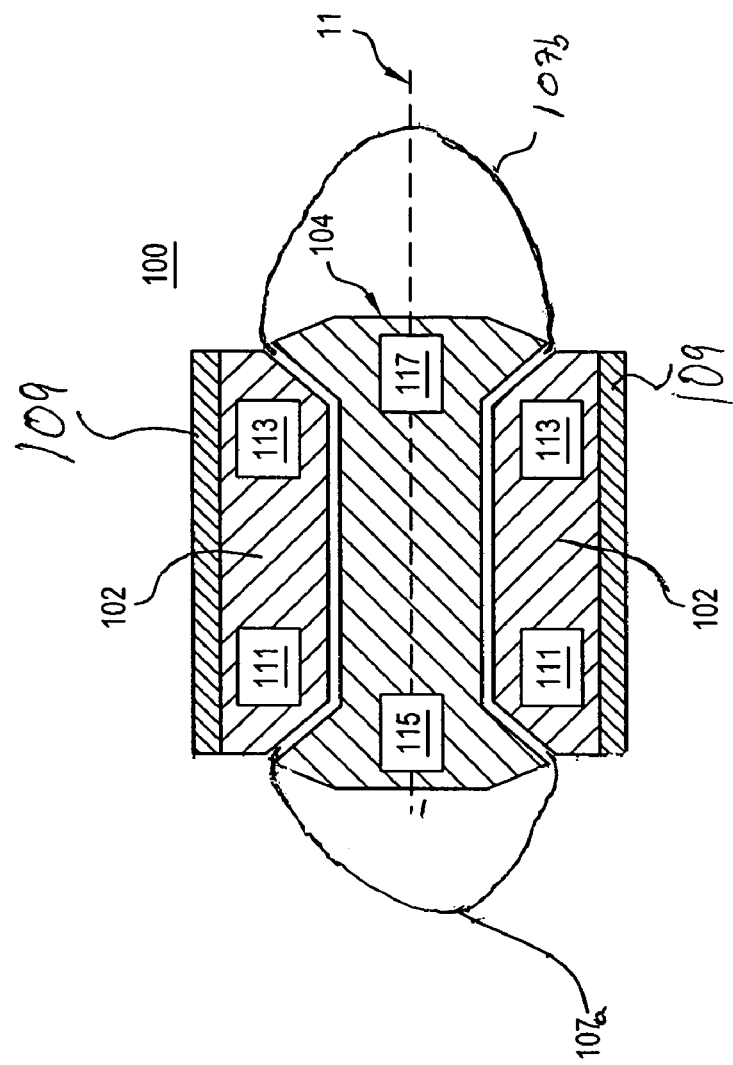
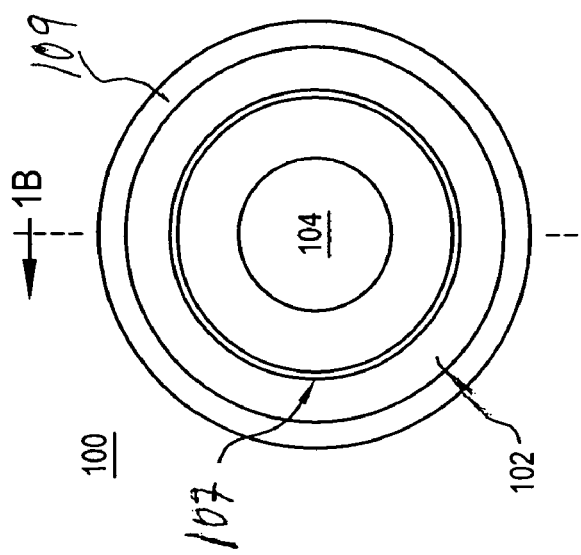
FIG. 1B
FIG. 1A

MAGNETIC BEARING ASSEMBLY USING REPULSIVE MAGNETIC FORCES

TECHNICAL FIELD

The present invention relates generally to magnetic bearings and, more particularly, to linear or radial magnetic bearings using repulsive magnetic forces.

BACKGROUND OF THE INVENTION

Mechanical bearings necessarily involve mechanical contact between the components, leading to well-known problems associated with friction and wear. Repulsive magnetic forces have been utilized in magnetic bearings, for example, to provide a non-contact, low-friction bearing. However, magnetic bearing structures require a design which may become quite complicated; for example, for radial magnetic bearings, it is necessary to maintain the rotating component aligned axially with the non-moving component, such as by providing a second magnetic gap to maintain such alignment. Nevertheless, the use of magnetic forces to provide a non-contact, low-friction bearing avoids the drawbacks attendant to mechanical bearings, thereby providing an attractive alternative.

In any magnetic suspension element that utilizes static magnetic forces between a stationary and a rotating component in a first direction, a stable state of equilibrium against external forces, e.g., gravity, in a second direction cannot exist. In other words, if such a bearing element is designed to be stable against transverse displacements, it will be unstable against axially directed displacements, and vice versa. This instability may be addressed by undesirably complicated and expensive electronic and magnetic control systems or the provision of a second magnetic gap, as mentioned above. U.S. Pat. No. 3,493,274 discloses a magnetic bearing utilizing two magnetic gaps, extending perpendicularly to one another, to keep the moving component in place relative to the non-moving component.

SUMMARY OF THE INVENTION

According to an embodiment of the present invention, a magnetic bearing assembly has an inner magnetic component and at least one outer magnetic component, each having a magnetic source. The assembly uses repulsive magnetic forces to control relative movement between the inner and outer components in at most five of six degrees of freedom while permitting relative movement between the components in at least one degree of freedom. The inner component and outer components define at least two continuous magnetic gaps, each angled with respect to the axis of the inner component. Each gap provides force vectors in first and second directions (which are two of the five degrees of freedom mentioned above), and the gaps collectively provide a stable equilibrium in the first and second directions. With a stable equilibrium, in response to relative movement of components to cause a decrease in the gap width of one of the gaps in the first or second direction, magnetic repulsive forces at the decreased gap width urge the components away from each other along the first or second directions to return to equilibrium.

In a further embodiment according to the present invention, the magnetic bearing is a radial magnetic bearing and comprises a radially inner component and a radially outer component, each having a magnetic source. The radially inner component has a first radially inner polarized end having a first polarity and a second radially inner polarized end having a second polarity opposite the first polarity. The radially outer component has a first radially outer polarized end having the first polarity and a second radially outer polarized end having the second polarity. In the assembly, the first radially outer end is axially aligned with the first radially inner end, and the second radially outer end is axially aligned with the second radially inner end. The radially inner component and the radially outer component are disposed for relative rotation around an axis of the radially inner component and are positioned to provide a first continuous end gap and a second continuous end gap. The first continuous end gap is defined between the radially inner component and the radially outer component at the first end and is angled with respect to the axis of the radially inner component. At the first end gap, a first end axial force vector urges relative movement between the radially inner component and the radially outer component in a first axial direction. The second continuous end gap is defined between the radially inner component and the radially outer component at the second end and is angled with respect to the axis of the radially inner component. At the second end gap, a second end axial force vector urges relative movement between the radially inner component and the radially outer component in a second axial direction opposite the first axial direction. At equilibrium, the magnitude of the first end axial force vector is equal to the magnitude of the second end axial force vector, and each gap provides a plurality of radial force vectors having a net magnitude of zero. In addition, the bearing assembly has a radially stable and an axially stable equilibrium.

In a further embodiment according to the present invention, the magnetic bearing is a linear magnetic bearing and comprises a longitudinally-extending inner component, two longitudinally-extending outer components, and a housing. The inner component and the outer components comprise a magnetic source. The inner component has a first inner polarized end having a first polarity and a second inner polarized end having a second polarity opposite the first polarity and has an axis perpendicular to the longitudinal direction and extending between the first end and the second end. Each outer component has a first outer polarized end having the first polarity and a second outer polarized end having the second polarity. In the assembly, each first outer end is aligned with the first inner end, and each second outer end is aligned with the second inner end. The housing is connected to each of the two outer components for mounting the two outer components in a fixed relationship to each other and for allowing relative longitudinal movement between the outer and the inner components. The two outer components are positioned relative to the inner component to provide first, second, third, and fourth continuous end gaps. The first and second end gaps are defined between the inner component and each of the two outer components at the first end, are angled with respect to the axis, and provide a first end force vector urging relative movement between the inner component and the two outer components in a first direction along the axis. The third and fourth end gaps are defined between the inner component and each of the two outer components at the second end, are angled with respect to the axis, and provide a second end force vector urging relative movement between the inner component and the two outer components in a second axial direction opposite the first axial direction. At equilibrium, the magnitude of the first end force vector is equal to the magnitude of the second end force vector, and each end gap provides a plurality of transverse force vectors having a net magnitude of zero. In addition, the bearing assembly has an axially stable and a transversely stable equilibrium.

In a further embodiment according to the present invention, the magnetic bearing is a linear magnetic bearing and comprises the inner component, outer components, and housing, as well as a mechanical element for controlling lateral and vertical movement between the inner component and the two outer components. In this embodiment, the gaps are configured such that they all exert a force in the same axial direction, namely opposing gravity. With this configuration, as the load on the load-bearing component increases, the width of the gaps in the axial direction decreases thereby increasing the repulsive magnetic force between the components.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. Included in the drawing are the following figures:

FIG. 1A is an end view of a radial magnetic bearing assembly according to an embodiment of the present invention;

FIG. 1B is a longitudinal cross-sectional view of the radial magnetic bearing assembly of FIG. 1A viewed along the line 1B—1B;

DETAILED DESCRIPTION OF THE INVENTION

Figure 2:
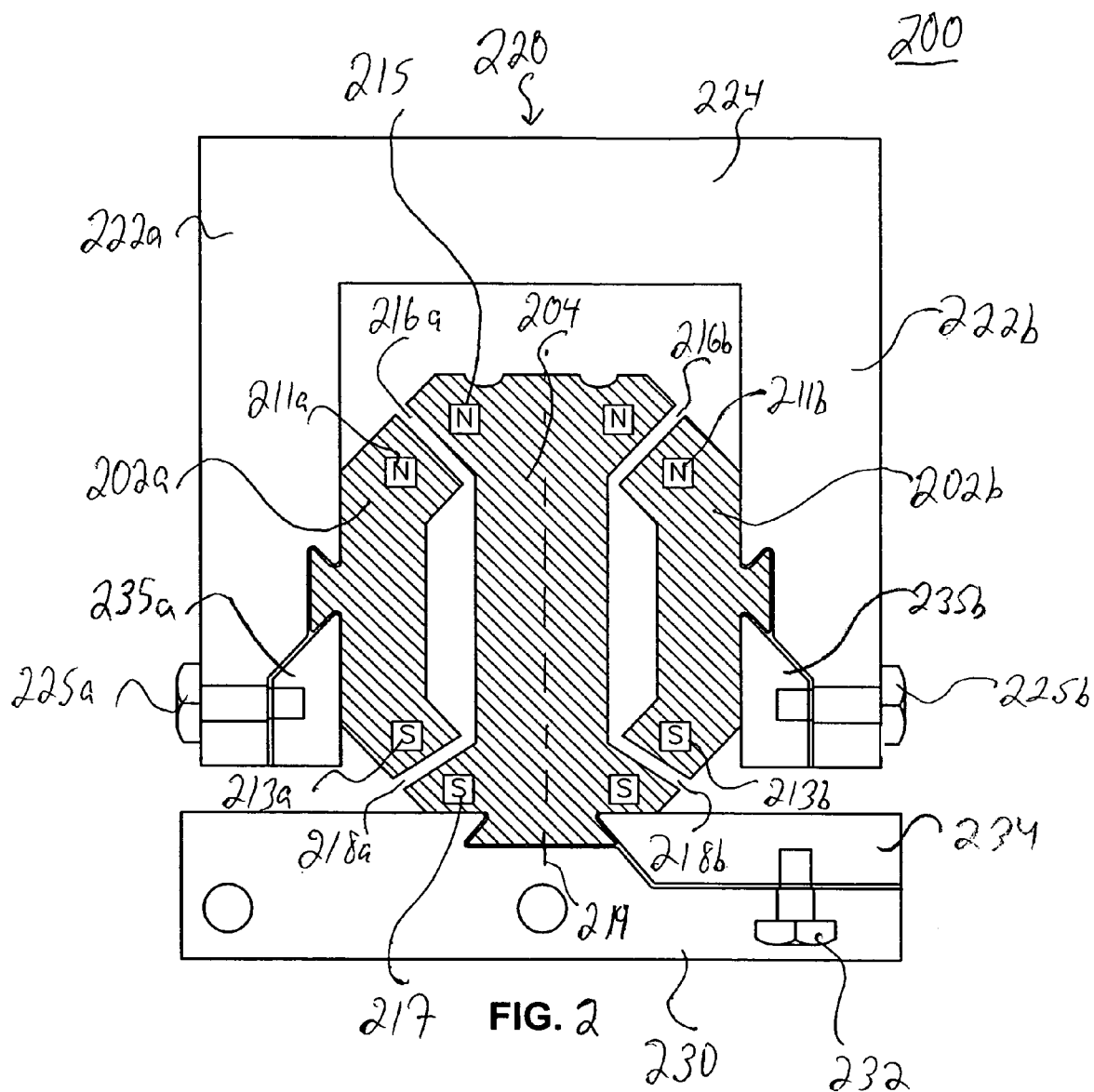
FIG. 2 is an axial cross-sectional view of a linear magnetic bearing assembly according to another embodiment of the present invention.

A general embodiment of the present invention is directed to the utilization of repulsive magnetic forces of components of a magnetic bearing assembly. As referred to herein, the components of the magnetic bearing assembly refer to the magnetic elements of the assembly which comprise a magnetic source. A magnetic bearing may consist only of the two components of the bearing which move relative to one another or it may include the two components and other elements, such as a magnetic shield, a retainer ring, a housing, a base or other known elements of magnetic bearing and related assemblies. The magnetic bearing according to the present invention can be used in a wide variety of industrial applications requiring a stable magnetic bearing, such as in gravity-free environments (e.g., outer space), and in any system under gravity requiring such a bearing.

According to a general embodiment of the invention, the magnetic bearing assembly has an inner magnetic component and at least one outer magnetic component. The inner magnetic component may be shaped like a spool and has an axis which extends from one end to the other through the center of the inner magnetic component. The assembly uses repulsive magnetic forces to control relative movement between the components in at most five of six degrees of freedom, while permitting relative movement between the components in at least a sixth degree of freedom. The six degrees of freedom are the x-, y-, and z-axes, and the three rotational directions about each of these axes. The inner component and the at least one outer component define at least two continuous magnetic gaps, each angled with respect to the axis and each providing force vectors in first and second directions. The at least two continuous gaps collectively provide a stable equilibrium in the first and second directions, thereby constraining motion in five of six degrees of freedom. As used herein, the term stable equilibrium in a particular direction means that, in response to relative movement of the inner component and the outer component to cause a decrease in the gap width along that direction, magnetic repulsive forces at the portion of decreased gap width urge the inner component and the outer component away from each other along that direction to return the assembly to equilibrium. The types of magnetic bearings according to the present invention include radial bearings, in which case the direction of relative movement of the components is rotational (for example, as shown in FIG. 1B, the one degree of freedom is rotational around axis 11) and linear bearings, in which case the direction of relative movement of the components is longitudinal movement (i.e., the one degree of freedom is translational).

Referring now to the drawing, in which like reference numbers refer to like components throughout the various figures that comprise the drawing, FIG. 1A is an end view and FIG. 1B is a longitudinal cross-sectional view of a radial magnetic bearing assembly 100 according to an embodiment of the present invention. As shown in FIGS. 1A and 1B, radial magnetic bearing assembly 100 has a radially inner component 104 (e.g., a rotor) disposed radially within and axially aligned with a radially outer component 102 (e.g., a stator). An axis 11 is the central axis of radially inner component 104 and, in embodiments in which radially inner component 104 is not held stationary with respect to outer component 102, it is capable of rotation about axis 11.

As shown in FIG. 1B, radially inner component 104 has a first radially inner polarized end 115 having a first polarity (e.g., north) and a second radially inner polarized end 117 having a second polarity (e.g., south) opposite the first polarity. While the ends are shown in FIG. 1B as just at the angled region (namely at the magnetic gaps 116a, 116b), the term "ends" as used herein could mean an entire half of the inner and outer components.

Inner component 104 and radially outer component 102 comprise a magnetic source. Magnetic source may either be a permanent magnetic material or an electromagnetically excited material. If a permanent magnetic material is used, any known material, such as non-rare earth permanent magnets or rare earth magnets may be used. Non-rare earth magnets include alnico (aluminum-nickel-cobalt), and rare earth magnets include neodymium-iron-boron and samarium-cobalt magnets. The material used will depend on the needs of the particular application, and it is well within the knowledge of one having ordinary skill in the art. The components might also include a surface coating to serve as a protective layer, which is also well-known in the art. Magnetic source might also be an electromagnetically excited material, which includes a core of highly magnetically permeable material and a coil of wire wound around the core, with the core capable of being magnetized by passing a current through the coil of wire. The magnetic sources of both components can be permanent magnets, the magnetic sources of both components can be electromagnets, or the magnetic source of one component can be a permanent magnet and the magnetic source of the other component can be an electromagnet. While such an embodiment has been contemplated by the present invention, it is nevertheless preferable that the moving component is not an electromagnetically excited material because of the undesirably complicated design of an electromagnet as a moving component in a radial bearing. In the case of an electromagnet, preferably a direct current source of power is used.

Magnetic bearing assembly 100 includes radially outer component 102, which may be and typically is similar in composition to radially inner component 104, although it is not necessarily so. Radially outer component has a first radially outer polarized end 111 having the first polarity (e.g., north) and a second radially outer polarized end 113 having the second polarity (e.g., south). After assembly and as shown in FIG. 1B, first radially outer end 111 is axially aligned with first radially inner end 115 and second radially outer end 113 is axially aligned with second radially inner end 117. As used in connection with this embodiment, reference to the axial direction (such as in "axially aligned") means the direction along axis 11.

To achieve this axial alignment, magnetic bearing assembly 100 can be assembled by configuring radially outer component 102 halves split longitudinally (i.e., each half is a 180° arc of outer component 102). The two halves are placed around the periphery of radially inner component 104 and then the entire assembly is slid into retainer ring 109 which serves to keep the two halves in place with respect to each other and with respect to radially inner component 104. The material of retainer ring 109 may be any non-magnetic material, such as brass. While retainer ring 109 is shown in the form of a cylinder, other forms, such as a helical winding, may be used.

According to an alternative method for assembling magnetic bearing assembly, radially inner component 104 is provided as two mating halves partitioned along a cut line perpendicular to axis 11 and preferably at the center of the component. A first half of radially inner component 104 is positioned in its proper place at a first end of radially outer component 102 and maintained in its proper relative position by a known manner. The second half of radially inner component 104 is forced into place at the opposite end of the radially outer component then attached to the first half. Once the two halves are attached, the two components maintain their proper relative positioning due to the magnetic repulsive forces, as discussed in detail below. To prevent any interference by metal objects or other magnetic objects, a magnetic shield (not shown) may be disposed peripherally around radially outer component 102 or around the ends of the components. A space should be formed between the magnetic shield and the components or retainer ring. The shield may be connected to the components by any non-magnetic material, such as brass. The material of the shield may be any high permeability material, such as nickel iron, iron, or low carbon steel.

As can be appreciated due to the maintaining of a gap between radially inner component 104 and radially outer component 102, the components are disposed for relative rotation around axis 11. More specifically, radially inner component 104, when it is the moving component, will rotate around axis 11, as axis 11 is the central axis of the radially inner component. When radially outer component 102 is the moving component, it also will rotate around axis 11 in the absence of any external force, such as gravity. One component is the moving component when the other is held stationary with respect to the moving component (e.g., affixed to an immovable base, housing, the axle of a moving car, or other object, for example). In the presence of gravity, however, the axis of rotation of radially outer component 102 will be offset from axis 11 by a slight distance, namely the difference in gap width from the centered position (as shown in FIG. 1B) caused by the external force. For convenience, the phrase "disposed for relative rotation around an axis" (such as axis 11), shall mean both the rotation of either component around axis 11 or the rotation of radially outer component 102 around an axis slightly offset from axis 11 due to an external force, such as gravity.

After assembly and as a result of the axially-aligned areas of repulsive magnetism of the two components, radially inner component 104 and radially outer component 102 are positioned to provide a first continuous end gap 107a and a second continuous end gap 107b. First continuous end gap 107a is defined by and located between radially inner component 104 and radially outer component 102 at the first end. First continuous gap 107a is angled with respect to axis 11. By being "continuous," first continuous end gap does not have any gaps or angled turns along its length. As a result of the angle, first continuous gap 107a provides a first end axial force vector urging relative movement between radially inner component 104 and radially outer component 102 in a first axial direction. (For convenience, it is said herein that the gaps provide force vectors because the force vectors can be viewed as emanating from the gaps, but one of ordinary skill would recognize that the gaps provide such force vectors only in conjunction with the magnetic components defining such gaps.) For example, if radially outer component 102 were grounded, then first end axial force vector would urge movement of radially inner component 104 to the left as shown in FIG. 1B.

First continuous end gap 107a also provides a plurality of radial force vectors at each radial coordinate around the end gap. For example, if radially outer component 102 were grounded, then the radial force vectors at the top quadrant of first continuous end gap 107a would urge movement of radially inner component 104 downward as shown in FIG. 1B. Because first continuous end gap 107a is symmetrical, the radial force vectors around the gap cancel each other out so that the radial force vectors have a net magnitude of zero, at equilibrium. Equilibrium is defined as the position of the two components relative to one another after the repulsive magnetic forces between the two components have been allowed to act on the two components after some perturbation in the axial or radial directions. This state of equilibrium typically involves a return of the components to a relative position at which the gap widths remain constant (and typically are the same across their length in the absence of any external force, such as gravity). In the presence of gravity, the gap widths at the top quadrant and at the bottom quadrant at equilibrium would have to be somewhat different to provide a net force upward on the moving component, countering the force of gravity. For example, if radially outer component 102 were grounded, then gravity would force radially inner component 104 downward as shown in FIG. 1B thereby reducing the gap width of first continuous end gap 107a at the bottom quadrant relative to the top quadrant. This difference in gap width would provide a net force upward, countering gravity, on radially inner component 104, thereby achieving an equilibrium under the force of gravity.

Second continuous end gap 107b is defined by and located between radially inner component 104 and radially outer component 102 at the second end. Second continuous gap 107b is angled with respect to axis 11. By being "continuous," second continuous end gap does not have any gaps or angled turns along its length. As a result of the angle, second continuous gap 107b provides a second end axial force vector urging relative movement between radially inner component 104 and radially outer component 102 in a second axial direction opposite the first axial direction. For example, if radially outer component 102 were grounded, then second end axial force vector would urge movement of radially inner component 104 to the right as shown in FIG. 1B.

As discussed above in connection with first continuous end gap 107a, second continuous end gap 107b also provides a plurality of radial force vectors at each radial coordinate around the end gap. For example, if radially outer component 102 were grounded, then the radial force vectors at the top quadrant of second continuous end gap 107b would urge movement of radially inner component 104 downward as shown in FIG. 1B. Because second continuous end gap 107b is symmetrical, the radial force vectors around the gap cancel each other out so that the radial force vectors have a net magnitude of zero, at equilibrium. Also as discussed above in connection with first continuous end gap 107a, gravity would cause a difference in gap width between the top and bottom quadrant of second continuous end gap 107b, which would provide a net force upward, countering gravity, on the moving component, thereby achieving an equilibrium under the force of gravity.

As can be appreciated, the magnitude of the first end axial force vector is equal to the magnitude of the second end axial force vector at equilibrium. If the material and configuration of the two components are symmetrical, then the gap widths of the two gaps 107a, 107b would also be the same at equilibrium. As can also be appreciated, bearing assembly 100 has a radially stable and axially stable equilibrium. This means that, in response to relative movement of radially inner component 104 and radially outer component 102 causing a decrease in the gap width of at least a portion of first continuous gap 107a or second continuous gap 107b, magnetic repulsive forces at the portion of decreased gap width urge the radially inner component and the radially outer component away from each other at that point to return to equilibrium. Stated another way, in a stable equilibrium, in response to an axial or radial perturbation, the repulsive magnetic forces tend to urge the two components back to the equilibrium position, namely with all equal gap widths or with gap widths with an offset between the top quadrant and the bottom quadrant to account for gravity (i.e., the weight of the moving component plus added weight of a supplemental component supported by the moving component). Thus, the radial bearing assembly can be said to control relative movement between the components in two directions, the axial and radial directions, while still allowing relative movement between the components in a third direction, namely the rotational direction.

As can be appreciated from viewing FIG. 1B, each end gap 107a, 107b is in the shape of a truncated cone. Varying the angle at which the end gaps 107a, 107b are disposed relative to axis 11 will vary the relative magnitudes of the radial and axial force vectors in response to a perturbation. For example, with a steeper angle, the axial force vector would be greater than the radial force vector. On the other hand, with a gentler angle, the radial force vector would be greater than the axial force vector. Although the angles can be selected depending on the particular needs of the bearing assembly, the angles of the first continuous gap and the second continuous gap with respect to the axis are between 30° and 60° in an embodiment of the invention and are about 45° in another. If it is desirable to provide a radial bearing which will have approximately equal gap width of the first and second gaps even under the force of gravity, it is possible to dispose the radial bearings such that axis 11 of radially inner component 104 is a vertical axis (by rotating assembly 90° from the position shown in FIG. 1B) and varying the angles formed by the first and second continuous gaps with respect to the axis such that there is a net upward force imparted on the moving component to counter the force of gravity. For example, if first continuous gap 107a is disposed vertically above second continuous gap 107b and the radially outer component is non-moving, then the angle of the first continuous gap would be formed greater than the angle of the second continuous gap to counter the force of gravity acting on radially inner component 104.

Referring now to FIG. 2, a cross-sectional view of a linear magnetic bearing assembly 200 according to another embodiment of the present invention is shown. As shown in FIG. 2, magnetic bearing assembly 200 has a longitudinally-extending inner component 204 and two longitudinally-extending outer components 202a, 202b. An axis 219 is the central axis of inner component 204 and extends between a first end and a second end of inner component and is perpendicular to the longitudinal direction.

Inner component 204 has a first inner polarized end 215 having a first polarity (e.g., north) and second inner polarized end 217 having a second polarity (e.g., south) opposite the first polarity. While the ends are shown in FIG. 2 as just the angled regions (namely, at the magnetic gaps 216a, 216b, 218a, 218b), the term "ends" as used herein could mean an entire half of the inner and outer components. Any magnetic source may be used for the components, as described in connection with the first embodiment. The inner component may be a permanent magnet material or an electromagnetically excited material, and the outer component may also either be the magnetic material or an electromagnetically excited material. When the embodiment shown as FIG. 2 is used as a train or other rail transportation device, the magnetic source of the outer components is preferably an electromagnetic and the magnetic source of the inner component is also preferably an electromagnetic, to avoid unnecessary attracting of stray metal objects.

Magnetic bearing assembly 200 includes a first outer component 202a and a second outer component 202b, which may be and typically are similar in composition to inner component 204, although they are not necessarily so. Each outer component 202a, 202b has a first outer polarized end 211a, 211b having a first polarity (e.g., north) and a second outer polarized end 213a, 213b having the second polarity (e.g., south). After assembly and as shown in FIG. 2, each first outer polarized ends 211a, 211b is axially aligned with first inner end 215, and each second outer end 213a, 213b is axially aligned with second inner end 217. As used in connection with this embodiment, reference to the axial direction (such as "axially aligned") means a direction along axis 219.

Linear magnetic bearing assembly 200 also includes a housing 220 which is connected to each of the two outer components 202a, 202b for mounting the two outer components in a fixed relationship to each other while allowing for relative longitudinal movement between the two outer components and inner component 204. As shown, housing has two legs 222a, 222b which are connected to each other along crossbar 224 and are individually connected to outer components 202a, 202b by screws 225a, 225b. By fixing the relationship of the two outer components, any movement due to an increase in repulsive force at one magnetic gap cause a decrease in the gap width of another magnetic gap. Thus, the forces at each magnetic gap are directly transferred to the other magnetic gaps similar to the first embodiment.

The housing may be of any structure capable of mounting the two outer components in a fixed relationship to each other while allowing for relative longitudinal movement. For example, while first outer component 202a, second outer component 202b, and housing 220 are shown as separate elements, these three elements can be formed as a single unitary piece.

In an embodiment of the invention, assembly 200 also includes a base 230 on which inner component 204 is mounted. Base 230 may be grounded in which case inner component 204 is stationary while the other components are moving components. Base 230 may be mounted to inner component 204 by using screw 232.

Magnetic bearing assembly 200 can be assembled by first forming a longitudinally inner component, which can be done by installing a plurality of individual magnets and mounting them onto base 230 by using wedge piece 234 and screw 232. Housing 224 can then be coupled to inner components 202a, 202b by use of wedge pieces 235a and 235b and screws 225a and 225b, respectively. After assembly, the housing with the two components can be slid onto one end of inner component 204. Thereafter, a stop may be placed on the ends of inner component 204. Alternatively, the parts could be assembled then magnetized.

As can be appreciated due to the maintaining of the gaps between inner component 204 and outer components 202a, 202b, the components are disposed for linear relative movement longitudinally. It should be pointed that a stop (not shown) may be placed at the longitudinal ends of the non-moving component so that the moving component does not extend linearly off of the non-moving component in a known manner. When inner component 204 is the moving component, housing 220 would be grounded and inner component 204 would extend longitudinally along the middle of two outer components 202a, 202b. On the other hand, as is the most typical envisioned embodiment, inner component 204 is stationary, namely grounded to immovable base, and outer components 202a, 202b move linearly along with housing 220 relative to inner component 204, which may be viewed as a rail.

After assembly and as a result of the axially-aligned areas of repulsive magnetism of the two components, inner component 204 and outer components 202a, 202b are positioned to provide first and second continuous end gaps 216a, 216b and third and fourth continuous end gaps 218a, 218b. First and second continuous end gaps 216a, 216b are angled with respect to axis 219 and provide a first end force vector urging relative movement between the inner component and the two outer components in a first direction along the axis. For example, if inner component 204 is grounded, then first end force vector would urge movement of outer components 202a, 202b downward as shown in FIG. 2.

Third and fourth continuous end gaps 218a, 218b are defined by and located between inner component 204 and outer components 202a, 202b at the second end. These end gaps are also angled with respect to axis 219. As a result, end gaps 218a, 218b provide a second end force vector urging relative movement between the inner component and two outer components in a second axial direction opposite the first direction. For example, if inner component 204 were grounded, then second axially force vector would urge movement of outer components 202a, 202b upward as shown in FIG. 2.

The four end gaps provide a plurality of transverse force vectors also. For example, just viewing the relationship between inner component 204 and outer component 202a, if inner component 204 were grounded, then the transverse force vectors at end gaps 216a and 218a would urge movement of outer component 202a to the left as shown in FIG. 2. Similarly, just viewing the relationship between inner component 204 and outer component 202b, the transverse force vectors at end gaps 216b and 218b will cause movement of outer component 202b to the right as shown in FIG. 2. Because the assembly is symmetrical, the transverse force vectors cancel each other out so that the transverse force vectors collectively have a net magnitude of zero at equilibrium. As mentioned above, transverse force vectors are in a direction transverse to the axis of the inner component and the longitudinal direction.

Equilibrium is defined as the position of the two components relative to one another after the repulsive magnetic forces between the components have been allowed to act on them after some perturbation in the axial or transverse directions. This state of equilibrium typically involves a return of the components to a relative position at which the gap would remain constant (and typically the same across their length in the absence of any external force, such as gravity). In the presence of gravity, the gap widths at the top and the bottom would be somewhat different to provide a net force acting upward on the moving component, countering the force of gravity. For example, if inner component 204 were grounded, then gravity would force outer components 202a, 202b downward as shown in FIG. 2, thereby reducing the gap width of second continuous end gaps 218a, 218b at the bottom quadrant relative to the top quadrant. This difference in gap width would provide a net force upward, countering gravity, acting on outer components 202a, 202b, thereby achieving an equilibrium under the force of gravity.

On the other hand, even in the presence of gravity, the magnetic bearing assembly can be configured to permit equal or substantially equal gap widths. This can be done by configuring the angles of the first and second gaps versus the third and fourth gaps in a way which imparts a net upward force on the moving component. For example, in the case where the inner component is stationary and the outer components are moving, the angle formed by the second continuous end gaps 218a, 218b is greater than the angle formed by the first continuous end gaps 216a, 216b (at the top) relative to the axis to impart a net upward force on the outer components countering gravity. As can be appreciated from reviewing FIG. 2, each end gap 216a, 216b, 218, 218b is planar in shape. The considerations of varying the angle of the end gaps with respect to axis 219 are the same in connection with the embodiment shown in FIGS. 1A and 1B.

As can be appreciated, the magnitude of the first end axial force vector is equal to the magnitude of a second end axial force vector at equilibrium. As can also be appreciated, bearing assembly 100 has an axially and a transversely stable equilibrium. This means that, in response to relative movement of outer components 202a, 202b and inner component 204 causing a decrease in the gap width of a portion of any of the four gaps 216a, 216b, 218a, 218b, magnetic repulsive forces at the portion of decreased gap width urge the components away from each other to return to equilibrium. Stated another way, in a stable equilibrium, in response to an axial or transverse perturbation, the repulsive magnetic forces tend to urge the two components back to the equilibrium position, namely with all equal gap widths or with gap widths having an offset between the first end continuous gaps 216a, 216b, and second continuous end gaps 218a, 218b, to account for gravity. Thus, the bearing assembly can be said to control relative movement between the components in two directions, the axial and transverse directions, while still allowing relative movement between the components in a third direction, namely, the longitudinal direction.

Figure 3:
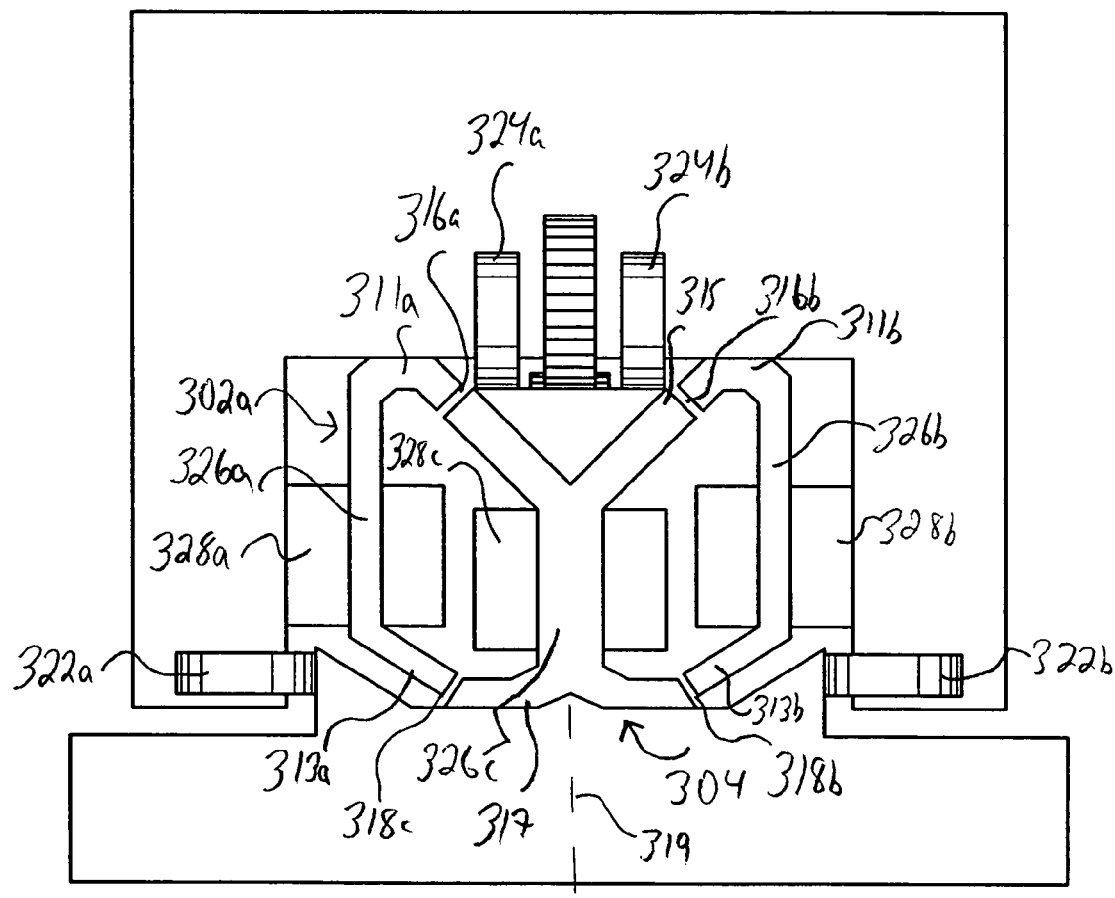
FIG. 3 is an end view of a linear magnetic bearing assembly according to still another embodiment of the present invention.

FIG. 3 shows a linear magnetic bearing assembly 300 which is similar to linear assembly 200 shown in FIG. 2, in many respects. For example, linear magnetic bearing assembly 300 includes a longitudinally-extending inner component 304 having a first inner polarized end 315 having a first polarity and a second inner polarized end 317 having a second polarity opposite the first polarity. Inner component 304 also has an axis 319 perpendicular to the longitudinal direction and extending between first end 315 and second end 317.

Also similar to the embodiment shown in FIG. 2, linear magnetic bearing assembly 300 has a first longitudinally-extending outer component 302a and a second longitudinally-extending outer component 302b, each of the outer components having first outer polarized end have ends 311a, 311b having the first polarity and second polarized ends 313a, 313b having the second polarity. Each first outer end 311a, 311b is individually aligned with first inner end 315. Similarly, each second outer end 313a, 313b is individually aligned with second inner end 317.

Also similar to the embodiment shown in FIG. 2, linear magnetic bearing assembly 300 includes a housing 320 connected to first outer component 302a and second outer component 302b for mounting the two outer components in a fixed relationship to each other and for allowing relative longitudinal movement between the two outer components and inner component 304.

Unlike the embodiment shown in FIG. 2, linear magnetic bearing assembly 300 includes some component or system for controlling lateral and vertical movement between inner component 304 and the two outer components 302a and 302b. A wide variety of known devices for doing so may be utilized, such as flanges, bearings, or wheels. As shown in FIG. 3, these devices are wheels bearing against various surfaces of inner component 304. In particular, a plurality of side wheels through 322a, 322b are coupled to the two outer component via housing 320 and individually bear against two side engaging surfaces of inner component 304 for controlling lateral movement of the outer components relative to the inner component. In this way, the plurality of side wheels 322a, 322b control the lateral (or transverse) distance in gaps 316a, 316b, 318a, 318b. Also included are one or more top wheels 324a, 324b similarly coupled to and moveable with the two outer components via housing 320. Top wheels 324a, 324b bear against the inner component for limiting vertically downward movement of the two outer components relative to the inner component. In this way, top wheels 324a, 324b limit the minimum clearance in the axial direction of gaps 316a, 316b, 318a, 318b.

As before, any magnetic source material can be used. The magnetic source for all three components shown in FIG. 3 are electromagnets. Each of the magnetic sources includes-iron core 326a–326c and a coil of wire 328a–328c wound on the soft iron cores, wherein the soft iron cores are magnetized by passing a current through the coil of wire.

As can be appreciated from the FIG. 3, the two outer components 302a and 302b are positioned relative to inner component 304 to provide first and second continuous end gaps 316a, 316b at the first end 315 and third and fourth continuous end gaps 318a, 318b at the second end. While the transversely stable equilibrium is achieved in the same manner as in the embodiment shown in FIG. 2, the axial equilibrium is somewhat different in that the force vectors in the axial direction of all four end gaps act in the same direction along the axis namely opposing gravity. In an embodiment, inner component 304 is a stationary component, such as in the form of a rail, and the two outer components are longitudinally moving components (such as part of a train) and are adapted to receive a supplemental load, such as a carriage or passengers and cargo on a train. In this embodiment, the first end force vector and second end force vector acting together against gravity would oppose the weight of the passengers, cargo, and train itself due to the configuration of the gaps and their relationship between the components. Upon increasing in this load (namely when more passengers board the train), the width of the gaps in the axial direction may decrease slightly thereby increasing the magnitude of the first and second force vectors acting on the two outer components to achieve a new stable equilibrium in the axial direction. After some point, the axial distance in the gaps will no longer decrease measurably due to the effect of the top wheels 324a, 324b; nonetheless, the present invention still serves to decrease the load on these wheels (and their bearings) due to the axial force vectors acting against the weight of the moving component.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed:

1. A linear magnetic bearing assembly comprising:
   a longitudinally-extending inner component comprising a first magnetic source having a first inner polarized end having a first polarity and a second inner polarized end having a second polarity opposite the first polarity and having an axis perpendicular to the longitudinal direction and extending between the first end and the second end;
   a first longitudinally-extending outer component having a second magnetic source and a second longitudinally-extending outer component having a third magnetic source, each of the longitudinally-extending outer components having a first outer polarized end having the first polarity and a second outer polarized end having the second polarity, each first outer end being aligned with the first inner end and each second outer end being aligned with the second inner end,
   a housing connected to each of the two outer components for mounting the two outer components in a fixed relationship to each other and for allowing relative longitudinal movement between the two outer components and the inner component;
   wherein the two outer components are positioned relative to the inner component to provide:
      first and second continuous end gaps between the inner component and each of the two outer components at the first end, wherein the first and second continuous gaps are angled with respect to the axis and provide a first end force vector urging relative movement between the inner component and the two outer components in a first direction along the axis;
      third and fourth continuous end gaps between the inner component and each of the two outer components at the second end, wherein the third and fourth continuous gaps are angled with respect to the axis and provide a second end force vector urging relative movement between the inner component and the two outer components in a second axial direction opposite the first axial direction, wherein the magnitude of the first end force vector is equal to the magnitude of the second end force vector at equilibrium; the first, second, third, and fourth continuous end gaps each provide a plurality of transverse force vectors having a net magnitude of zero at equilibrium, wherein the transverse force vectors are in a direction transverse to the axis of the inner component and the longitudinal direction; and the bearing assembly has an axially stable and a transversely stable equilibrium, wherein, in response to movement of the inner component relative to the outer component to cause a decrease in the gap width of at least a portion of one of the gaps, magnetic repulsive forces at the portion of decreased gap width urge the inner component and the outer component away from each other to return to equilibrium.

2. An assembly according to claim 1, wherein the first magnetic source comprise a core of highly magnetically permeable material and a coil of wire wound on the core, wherein the core is magnetized by passing a current through the coil of wire and the second and third magnetic sources comprise a permanent magnetic material.

3. An assembly according to claim 1, wherein the first, second, and third magnetic sources each comprise a core of highly magnetically permeable material and a coil of wire wound on the core, wherein the core is magnetized by passing a current through the coil of wire.

4. An assembly according to claim 1, wherein the angles of the first, second, third, and fourth continuous gaps with respect to the axis are between 30° and 60°.

5. An assembly according to claim 4, wherein the angles of the first, second, third, and fourth continuous gaps with respect to the axis are about 45°.

6. An assembly according to claim 1, wherein the inner component and the at least two outer components comprise niodimium iron boron.

7. An assembly according to claim 1, wherein the first, second, third, and fourth continuous gaps are planar in shape.

8. An assembly according to claim 1 further comprising a base on which the inner component is mounted.

9. An assembly according to claim 7, wherein the base is grounded, wherein the inner component is stationary and the outer components are moving components.

10. An assembly according to claim 9, wherein the axis of the inner component is a vertical axis, the first and second continuous gaps are disposed vertically above the third and fourth continuous groups, and the angle formed by the third and fourth continuous groups is greater than the angle formed by the first and second continuous gaps relative to the axis.

11. A linear magnetic bearing assembly comprising:
a longitudinally-extending inner component comprising a first magnetic source having a first inner polarized end having a first polarity and a second inner polarized end having a second polarity opposite the first polarity and having an axis perpendicular to the longitudinal direction and extending between the first end and the second end;
a first longitudinally-extending outer component having a second magnetic source and a second longitudinally-extending outer component having a third magnetic source, each of the longitudinally-extending outer components having a first outer polarized end having the first polarity and a second outer polarized end having the second polarity, each first outer end being aligned with the first inner end and each second outer end being aligned with the second inner end;
a housing connected to each of the two outer components for mounting the two outer components in a fixed relationship to each other and for allowing relative longitudinal movement between the two outer components and the inner component; and
means for controlling lateral and vertical movement between the inner component and the two outer components;
wherein the two outer components are positioned relative to the inner component to provide:
first and second continuous end gaps between the inner component and each of the two outer components at the first end, wherein the first and second continuous gaps are angled with respect to the axis and provide a first end force vector urging relative movement between the inner component and the two outer components in a first direction along the axis opposing gravity;
third and fourth continuous end gaps between the inner component and each of the two outer components at the second end, wherein the third and fourth continuous gaps are angled with respect to the axis and provide a second end force vector urging relative movement between the inner component and the two outer components in the first direction,
wherein the first, second, third, and fourth continuous end gaps each provide a plurality of transverse force vectors having a net magnitude of zero at equilibrium, wherein the transverse force vectors are in a direction transverse to the axis of the inner component and the longitudinal direction; and the bearing assembly has an axially stable and a transversely stable equilibrium, wherein, in response to movement of the inner component relative to the outer component to cause a decrease in the gap width of at least a portion of one of the gaps, magnetic repulsive forces at the portion of decreased gap width urge the inner component and the outer component away from each other to return to equilibrium.

12. An assembly according to claim 11, wherein the inner component is a stationary component in the form of a rail and the two outer components are longitudinally moving component and are adapted to receive a supplemental load.

13. An assembly according to claim 12, wherein, upon an increase in the supplemental load, the width of the gaps in the axial direction decreases thereby increasing the magnitude of the first and second force vectors acting on the two outer components to achieve a new stable equilibrium in the axial direction.

14. An assembly according to claim 12, wherein the means for controlling lateral and vertical movement between the inner component and the two outer components comprise:
a plurality of side wheels individually coupled to the two outer components and individually bearing against two side engaging surfaces of the inner component for controlling lateral movement of the outer components relative to the inner component; and
one or more top wheels coupled to the housing and bearing against a top engaging surface of the inner component for limiting the vertically downward movement of the two outer components relative to the inner component.

* * * * *

UNITED STATES PATENT AND TRADEMARK OFFICE
CERTIFICATE OF CORRECTION

| | |
|---|---|
| PATENT NO. | : 7,126,244 B2 |
| APPLICATION NO. | : 11/027541 |
| DATED | : October 24, 2006 |
| INVENTOR(S) | : John J. Rozmus |

It is certified that error appears in the above-identified patent and that said Letters Patent is hereby corrected as shown below:

On the title page, item (75), "Inventor: John J. Rozmus, Brewyn, PA (US)" should read --Inventor: John J. Rozmus, Berwyn, PA (US)--.

Signed and Sealed this

Twenty-third Day of January, 2007

JON W. DUDAS
*Director of the United States Patent and Trademark Office*